United States Patent
Too

(10) Patent No.: US 7,099,550 B1
(45) Date of Patent: Aug. 29, 2006

(54) ANGULAR OPTICAL COMPONENT RETENTION AND REMOVAL SYSTEM

(75) Inventor: Thierry Sin Yan Too, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 191 days.

(21) Appl. No.: 10/806,395

(22) Filed: Mar. 23, 2004

(51) Int. Cl.
*G02B 6/00* (2006.01)

(52) U.S. Cl. ................ 385/134; 385/135; 385/136
(58) Field of Classification Search ......... 385/134–136
See application file for complete search history.

(56) References Cited

U.S. PATENT DOCUMENTS 5,306,159 A * 4/1994 Noll et al. .............. 439/61
2003/0123811 A1 * 7/2003 Lyon ...................... 385/59
2004/0109660 A1 * 6/2004 Liberty .................. 385/135

* cited by examiner

Primary Examiner—Brian Healy
Assistant Examiner—Jerry Martin Blevins
(74) Attorney, Agent, or Firm—Merek, Blackmon & Voorhees, LLC

(57) ABSTRACT

Disclosed herein is an angular optical component retention and removal system that reduces the amount of space needed to accommodate fiber optic cables and enables optical components to be quickly and easily inserted, retained, and removed from an optical communications system. The optical component retention and removal system may include a single or plural angular retention sections that retain optical components in an angular orientation through a faceplate. The system may further include an insertion/retention mechanism that enables an optical component to be inserted and removed with a single hand. With the system, fiber optic cables extend at an angle from the optical components, requiring less clearance space in front of the faceplate for provision of the fiber optic cables.

11 Claims, 4 Drawing Sheets

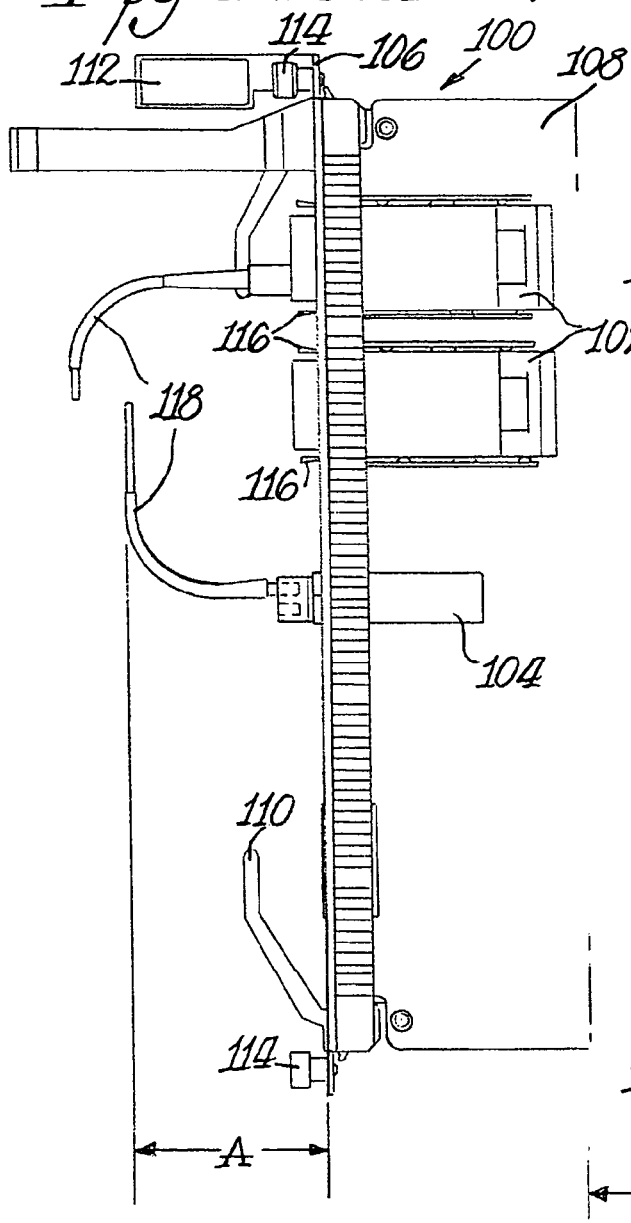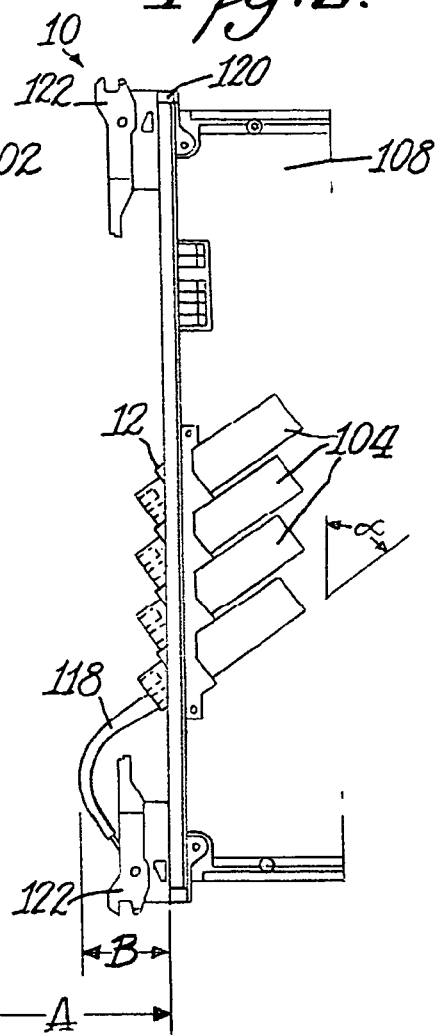

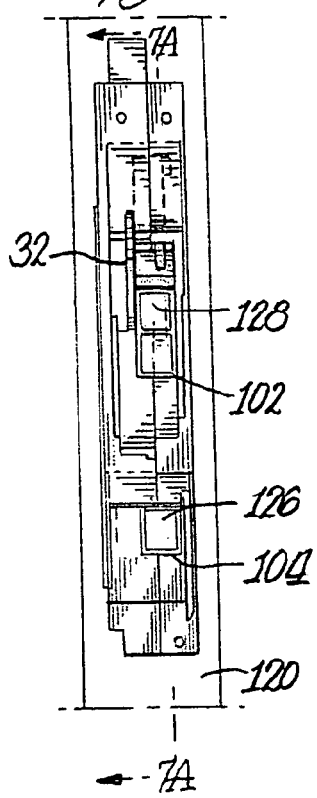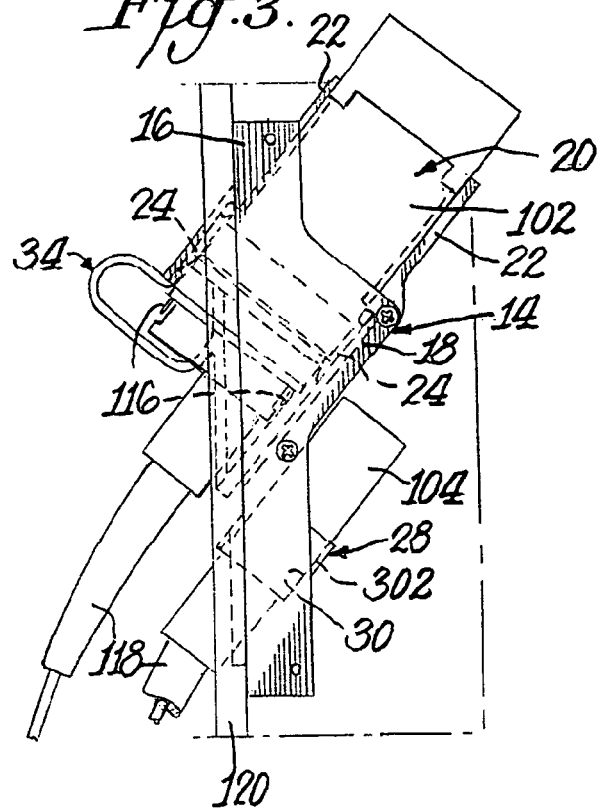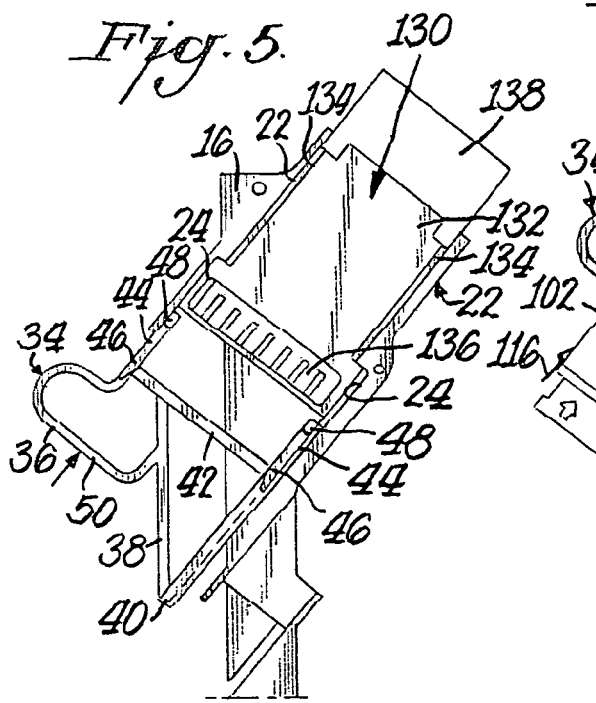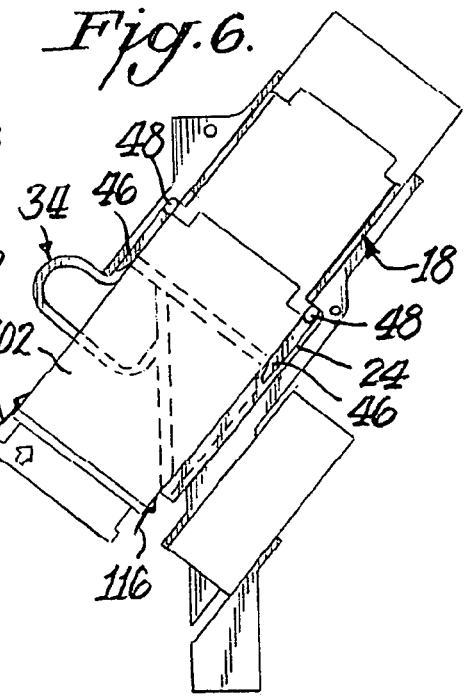

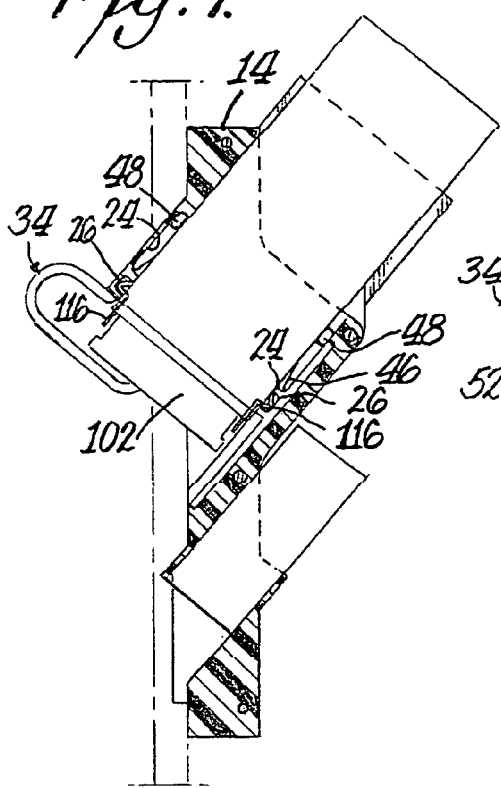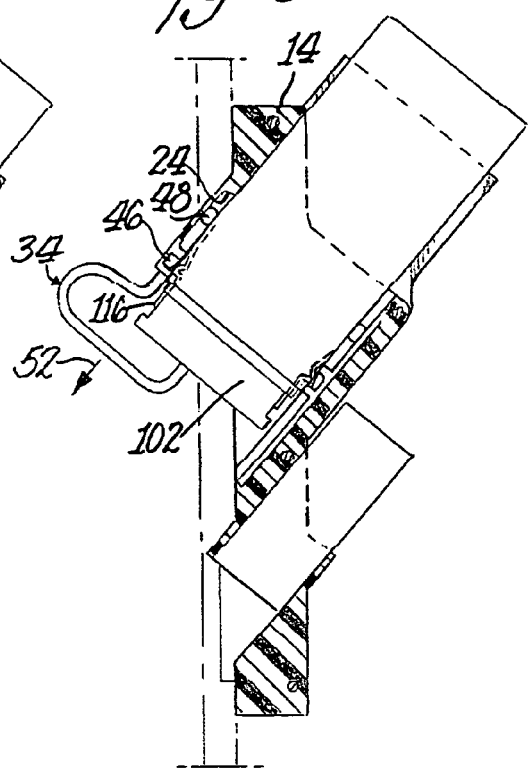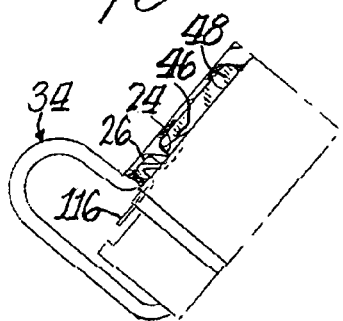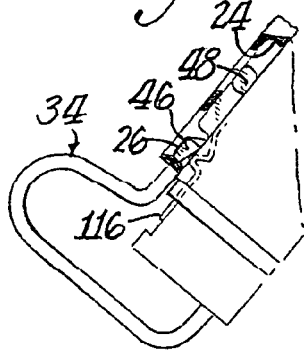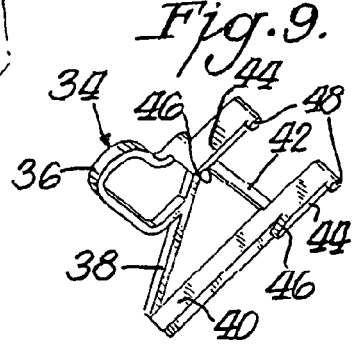

ANGULAR OPTICAL COMPONENT RETENTION AND REMOVAL SYSTEM

BACKGROUND OF THE INVENTION

A. Field of the Invention

The present invention relates generally to the communications field, and, more particularly to an angular optical component retention and removal system for use in the communications field.

B. Description of the Related Art

Optical communication equipment is typically housed in bays, which include a rectangular frame having dimensions conforming to a particular standard, such as the Network Equipment Building Standard (NEBS). NEBS covers a large range of requirements including criteria for personnel safety, protection of property, and operational continuity. NEBS covers both physical requirements including: space planning, temperature, humidity, fire, earthquake, vibration, transportation, acoustical, air quality and illumination; and electrical criteria including: electrostatic discharge (ESD), electromagnetic interference (EMI), lightning and AC power fault, steady state power induction, corrosion, DC potential difference, electrical safety and bonding and grounding. The term "electrostatic discharge" or "ESD", as used herein, refers to the rapid, spontaneous transfer of electrostatic charge induced by a high electrostatic field. Usually the charge flows through a spark (static discharge) between two bodies at different electrostatic potentials as they approach one another.

An optical communications equipment frame further typically has a plurality of shelves, each having one or more slots for accommodating circuit boards or cards that have optical and electrical components associated with a communication network mounted thereon. Such optical components include, but are not necessarily limited to optical module/components, connectors, lasers, photodetectors, optical amplifiers, switching elements, add/drop multiplexers etc. In addition, fiber optic cables typically connect to one or more component.

Furthermore, the recent increase in bandwidth requirements for telecommunications systems has resulted in more densely packed equipment and fiber optic cables than prior systems. Many carriers or other consumers of optical communications equipment have very limited floor space in which to place new equipment and fiber optic cables. For example, some carriers may only have a single open bay (or shelf) in which to place new equipment and fiber optic cables. If the communications equipment can be more densely packed, then a greater amount of equipment and fiber optic cables may be placed within the available space. The fiber optic cables housed within optical communications equipment are also exposed to damage when the doors to the equipment are closed due to the close fit between the doors and the fiber optic cables.

Electrical and electro-optical circuit packs ("circuit packs"), which are examples of optical modules/components, include a circuit board with components mounted thereon. In a typical interconnection scheme, a plurality of pins are provided through a backplane mounted at the far end of a shelf. Each circuit pack is inserted horizontally and/or vertically into the shelf (also known as a "subrack") on guideways and through a faceplate so that the connector engages the appropriate pins for connection to that circuit pack when the circuit pack is in its final position. The circuit pack is usually inserted into the backplane using a lever, sometimes referred to as a latch, injector-ejector, or circuit pack ejector system.

Typically, circuit packs have front panels, which may have multiple connectors or other components that connect to other devices. The physical front panel size of the circuit pack limits the number of connectors that may be implemented. The circuit pack size (i.e., the front panel) is limited by the physical dimensions of the chassis.

Additionally, fiber or other copper cabling may extend from connectors fastened to a circuit pack front panel. Due to the cable bend radius limitations, a great deal of space in front of the circuit pack may be required. This space constraint may cause certain components to be unusable.

Presently, it is a problem in the field of communication cable installation to ensure the precise placement of the communication cable without the possibility of damage to the communication cable by the provision of tight bends, or inappropriate use of fasteners, or inadequate support to the communication cable. Such communication cables include conventional telephone cable having a plurality of copper conductors, coaxial cable, optical fiber, or the like. In all of these applications, the minimum radius of curvature of the communication cable is well defined, and bending the communication cable in a tighter bend can cause damage to the communication medium housed within the cable. The installer of communication cable is thus faced with the problem of routing the communication cable over surfaces, which typically include sharp bends, without over bending the communication cable, yet also securing the communication cable to these surfaces in a manner to ensure protection from damage.

This problem is further heightened when fiber optic cables (alternatively referred to as "optical fibers" or "fibers") are used. Glass fibers used in such cables are easily damaged when bent too sharply and require a minimum bend radius to operate within required performance specifications. The minimum bend radius of a fiber optic cable depends upon a variety of factors, including the signal handled by the fiber optic cable, the style of the fiber optic cable, and equipment to which the fiber optic cable is connected. For example, some fiber optic cables used for internal routing have a minimum bend radius of 0.75 inches, and some fiber optic cables used for external routing have a minimum bend radius of 1.0 inches.

Damaged fiber optic cables may lead to a reduction in the signal transmission quality of the cables. Accordingly, fiber optic cables are evaluated to determine their minimum bend radius. As long as a fiber optic cable is bent at a radius that is equal to or greater than the minimum bend radius, there should be no reduction in the transmission quality of the cable. If a fiber optic cable is bent at a radius below the minimum bend radius determined for such cable, there is a potential for a reduction in signal transmission quality through the bend. The greater a fiber optic cable is bent beyond or below its minimum bend radius, the greater the potential for breaking the fiber(s) contained in the cable, and the shorter the life span of the cable.

If a network component requires maintenance or an upgrade, the circuit pack containing the component or a component module is typically removed from the shelf. However, since fiber optic cables are typically fragile, if the fiber optic cable is bent beyond the minimum bend radius during board or module removal, the fiber optic cable may break. Accordingly, removal and insertion of component boards or modules can be difficult and inconvenient.

FIG. 1 shows a conventional arrangement 100 for mounting optical module/components 102 and other optical components 104 horizontally in the shelf of an optical communications equipment frame (not shown). Arrangement 100 includes a faceplate 106 attached to a "mother" or main printed circuit board ("PCB") 108 and through which optical module/components 102 and optical components 104 may be provided. A handle 110 and a releasable handle 112 may connect to faceplate 106 for releasably attaching faceplate 106 and main PCB 108 to the shelf. Screws 114 may also be provided through faceplate 106 for releasably connecting faceplate 106 and main PCB 108 to the shelf.

Optical module/components 102 releasably connect through openings in faceplate 106 with spring retainers 116. Spring retainers 116 releasably engage faceplate 106 when optical module/components 102 are pushed into the openings of faceplate 106. Each optical module/component 102 may be removed from faceplate 106 by forcing spring retainers 116 inward toward optical module/component 102, and by pulling optical module/component 102 away from faceplate 106. This is a cumbersome process since two spring retainers 116 need to be manipulated while each optical module/component 102 is manually pulled away from faceplate 106.

As further shown in FIG. 1, optical module/components 102 and optical components 104 are aligned horizontally in faceplate 106. With this configuration, the fiber optic cables or optical cables 118 emanating from optical module/components 102 and optical components 104 also extend horizontally, requiring, for example, a distance A of empty space in front of faceplate 106 for accommodation of cables 118 without bending cables 118 beyond their minimum bend radii. If proper spacing is not provided between faceplate 106 and the optical communications cabinet door, then fiber optic cables 118 may be bent beyond their minimum bend radii, potentially damaging cables 118 and communication link provided thereby.

Thus, there is a need in the art for an optical component retention and removal system that overcomes the limitations and problems of the related art.

SUMMARY OF THE INVENTION

The present invention solves the problems of the related art by providing an angular optical component retention and removal system that reduces the amount of space needed to accommodate the fiber optic cables and enables optical components to be quickly and easily inserted, retained, and removed from an optical communications system. The optical component retention and removal system may include a single or plural angular retention sections that retain optical module/components in an angular orientation through the faceplate. The optical component retention and removal system may also include a single or plural angular retention sections that retain other optical components in an angular orientation through the faceplate. The system may further include an insertion/retention mechanism that enables an optical module/component to be quickly inserted and removed with a single hand. With the system of the present invention, the fiber optic cables extend at an angle from the optical module/components or the optical components, requiring less clearance in front of the faceplate for provision of the fiber optic cables. By requiring less clearance space, the system of the present invention enables the main or mother PCB to be extended, enabling more densely packed optical components on the main or mother PCB. Thus, the system of the present invention is extremely useful in today's world where PCB space is precious and more and more optical components need to be populated on PCBs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a side elevational view of a conventional arrangement for horizontally mounting optical components and optical module/components in a shelf of an optical communications equipment frame;

FIG. 2 is a side elevational view of an angular optical component retention and removal system of the present invention for mounting optical components and optical module/components in a shelf of an optical communications equipment frame;

FIG. 3 is a side elevational view of another preferred arrangement of the angular optical component retention and removal system of the present invention;

FIG. 4 is a front elevational view of the angular optical component retention and removal system shown in FIG. 3;

FIG. 5 is a side elevational view of the angular optical component retention and removal system shown in FIGS. 3 and 4, with an insertion/removal mechanism partially inserted into the system;

FIG. 6 is a side elevational view of the angular optical component retention and removal system shown in FIGS. 3–5, with the insertion/removal mechanism completely inserted into the system;

FIG. 7 is a cross-sectional side elevational view of the angular optical component retention and removal system, taken along line 7A—7A of FIG. 4, with the insertion/removal mechanism and an optical module/component completely inserted and latched in the system;

FIG. 7A is an enlarged fragmental view in elevation of the angular optical component retention and removal system shown in FIG. 7;

FIG. 8 is a cross-sectional side elevational view of the angular optical component retention and removal system, taken along line 7A—7A of FIG. 4, with the insertion/removal mechanism and the optical module/component being disengaged for removal from the system;

FIG. 8A is an enlarged fragmental view in elevation of the angular optical component retention and removal system shown in FIG. 8;

FIG. 9 is a perspective view of the insertion/removal mechanism shown in FIGS. 3–8A.

DETAILED DESCRIPTION OF EMBODIMENTS OF THE INVENTION

Figure 10:
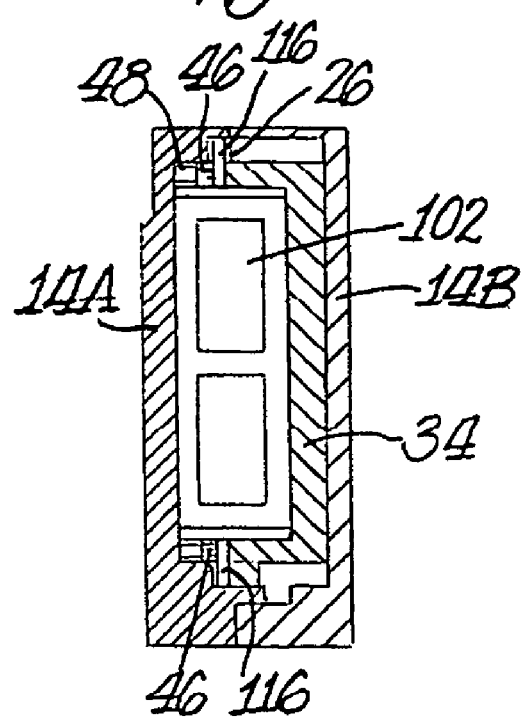
FIG. 10 is a cross-sectional view in elevation, taken along line 10—10 of FIG. 3, of the angular optical component retention and removal system shown in FIGS. 3–9.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

An angular optical component retention and removal system in accordance with embodiments of the present invention is shown in FIGS. 2–10 and designated generally as reference numeral 10. FIG. 2 shows a first embodiment of angular optical component retention and removal system 10, wherein system 10 retains a plurality of optical components 104. Although four optical components 104 are shown in FIG. 2, the system of the present invention is not limited to this number, and system may retain more or less than four optical components 104. Furthermore, system 10 may also retain a plurality of optical module/components 102, or a combination of optical module/components 102 and optical components 104. Optical components 104 include, but are not necessarily limited to optical module/components, connectors, lasers, photodetectors, optical amplifiers, switching elements, add/drop multiplexers etc. In addition, fiber optic cables 118 typically connect to one or more component.

As further shown in FIG. 2, a faceplate 120 attaches to a "mother" or main printed circuit board ("PCB") 108 and through which optical components 104 may be provided. Releasble handles 122 may connect to faceplate 120 for releasably attaching faceplate 120 and main PCB 108 to the shelf of an optical communications cabinet. Angular optical component retention and removal system 10 includes an angular retainer housing 12 that extends through an opening of faceplate 120, and connects to faceplate 120 via conventional connection mechanisms (e.g., screws, nuts and bolts, etc.). Retainer housing 12 includes openings for receiving and retaining optical components 104 in an angular orientation to the direction of faceplate 120.

Although retainer 12 is shown retaining optical components 104 at a specific angular orientation, retainer housing 12 may retain optical components 104 at a variety of angular orientations. Preferably, retainer housing 12 retains optical components 104 at an angle that reduces the clearance space needed in front of faceplate 120 for provision of fiber optic cables 118 emanating from optical components 104, without exceeding the minimum bend radii of fiber optic cables 118. Since fiber optic cables have a variety of minimum bend radii, the angle of retainer housing 12 will depend upon the types of fiber optics cables being used in the optical communications equipment. By way of example only and not limitation of the present invention, an angle α of less than ninety (90) degrees, and, more preferably, between about forty (40) and about fifty-five (55) degrees may be used in the present invention. By providing such an angular orientation, the amount of space required for fiber optic cables 118 is reduced to distance B, which is significantly less than distance A of the conventional arrangement 100 shown in FIG. 1. For example, distance B may be about 1.5 inches less than distance A. By requiring less clearance space, the system 10 of the present invention enables mother PCB 108 to be extended, enabling more densely packed optical components on mother PCB 108.

Retainer housing 12 may be made from a variety of conductive materials, including for example, sheet metal, aluminum alloy, aluminum, stainless steel, or plastic. A preferred material for retainer housing 12 is a material that attenuates or shields EMI, such as sheet metal. The EMI attenuating retainer housing 12 protects PCB 108 and its optical components 104 and cables 118 from destructive EMI energy.

FIGS. 3–10 show another preferred arrangement of the angular optical component retention and removal system of the present invention. For ease of reference, the alternative arrangement shows a single optical module/component 102 and a single optical component 104 being retained, although more or less optical module/components 102 and/or optical components 104 may be provided. As shown in FIGS. 3–10, the system includes a retainer housing 14 made of the same materials as retainer housing 12. The retainer housing 14 includes a main body portion 16, a first section 18, and a second section 28, either integrally formed or separately formed but connected together. Main body portion 16 may connect to faceplate 120 via conventional connection mechanisms (e.g., screws, nuts and bolts, etc.). As shown in FIG. 10, retainer housing 14 be formed of two parts, a left part 14A and a right part 14B, that are connected together with conventional connection mechanisms (e.g., weld, adhesive, screws, nuts and bolts, etc.).

First section 18 includes an opening 20 formed by a pair of spaced, angular sidewalls 22, wherein sidewalls 22 are provided at angle α discussed above. Optical module/component 102 may be received in opening 20 of first section 18 and retained therein between sidewalls 22. Each sidewall 22 may contain a cam slot 24 (discussed in more detail below) and a spring retainer slot 26 (see FIGS. 7, 7A, 8, and 8A—discussed more fully below) for retaining a spring retainer 116 of optical module/component 102. When spring retainers 116 are engaged in their corresponding retainer slots 26, optical module/component 102 is retained within first section 18 of retainer housing 14.

Second section 28 also includes an opening 30 formed by a pair of spaced, angular sidewalls 32, wherein sidewalls 32 are provided at angle α discussed above. Optical component 104 may be received and retained in opening 30 of second section 28 due to a friction fit between optical component 104 and sidewalls 32 or via other connection mechanisms (e.g., adhesive, screws, nuts and bolts, etc.). Fiber optic cables 118 emanate from and connect to optical module/component 102 and optical component 104 to optically couple these elements to other portions of an optical communications system.

As shown in FIG. 4, optical component 104 may include a connector socket 126 that physically and optically couples optical component 104 to fiber optic cables 118. Likewise, optical module/component 102 may include connector sockets 128 that physically and optically couple optical module/component 102 to fiber optic cables 118. Each connector socket 128 would receive a single fiber optic cable 118.

The angular optical component retention and removal system of the present invention may also include an insertion/removal mechanism 34, as best shown in FIGS. 5 and 9, for inserting and removing optical module/component 102 to and from first section 18 of retainer housing 14. FIG. 5 shows insertion/removal mechanism 34 positioned away from first section 18 of retainer housing. Although insertion/removal mechanism 34 is shown for use with retainer housing 14 of the present invention, mechanism 34 may also be used with the conventional arrangement 100 for mounting optical module/components 102 and other optical components 104 horizontally in the shelf of an optical communications equipment frame, as shown in FIG. 1. However, faceplate 106 may need to be modified to accommodate the geometrical aspects of insertion/removal mechanism 34.

Insertion/removal mechanism 34 may include a handle portion 36 that connects to a diagonal member 38 that connects to a horizontal member 40. Diagonal member 38 also connects to a cross member 42 that connects sidewall portions 44 together. One sidewall portion 44 may also connect to handle portion 36, whereas the other sidewall portion 44 may extend from or connect to horizontal member 40. Each sidewall portion 44 may include a cam portion 46 and a projection portion 48. All of the components making up insertion/removal mechanism 34 may be integrally formed together of a common material (e.g., plastic, stainless steel, etc.) or may be separately formed of different or similar materials and connected together using conventional connection mechanisms (e.g., adhesive, welds, etc.).

When a user forces insertion/removal mechanism 34 in the direction of directional arrow 50, insertion/removal mechanism 34 will be received in first section 18 of retainer housing 14, as best shown in FIG. 6. Each cam portion 46 and projection portion 48 will be received in a corresponding cam slot 24 of first section 18. As further shown in FIG. 6, the portion of optical module/component 102 with the spring retainers 116 remains outside of first section 18.

As further shown in FIG. 5, retainer housing 14 may include a secondary housing 130 that further retains optical module/component 102 and optically and/or electrically couples optical module/component 102 to main PCB 108. Secondary housing 130 may be made of the same materials as retainer housing 14, and includes a top portion 132, a bottom portion (not shown) opposing top portion 132, and side portions 134. Top portion 132, bottom portion, and side portions 134 form a cavity sized to about the dimensions of optical module/component 102 for receipt of optical module/component 102 therein. Side portions 134 fit within and are provided at the same angle α as sidewalls 22 of retainer housing 14. Secondary housing 130 may further include a contact pad 136 with a plurality of contacts for electrically coupling optical module/component 102 to main PCB 108. A connector 138 may also be provided at one open end of secondary housing 130 for electrically coupling optical module/component 102 to main PCB 108. FIG. 5 shows optical module/component 102 coupled to connector 138, whereas FIG. 6 shows optical module/component 102 disengaged from connector 138.

FIGS. 7 and 7A show a cross-sectional side elevational view of retainer housing 14, taken along line 7A—7A of FIG. 4, and further show insertion/removal mechanism 34 and optical module/component 102 fully inserted and latched in retainer housing 14. As shown, each cam portion 46 and projection portion 48 are provided in a corresponding cam slot 24 of retainer housing 14. As further shown, each spring retainer 116 is provided (i.e., latched) in a corresponding spring retainer slot 26 for retaining optical module/component 102 in retainer housing 14. Removal of optical module/component 102 from retainer housing simply requires pulling insertion/removal mechanism 34 in the direction of directional arrow 52 (as shown in FIG. 8).

FIGS. 8 and 8A show a cross-sectional side elevational view of retainer housing 14, taken along line 7A—7A of FIG. 4, and further show how insertion/removal mechanism 34 is used to remove optical module/component 102. As shown, each cam portion 46 of insertion/removal mechanism 34 engages a corresponding spring retainer 116, forcing spring retainers 116 from their spring retainer slots 26. With spring retainers 116 disengaged from slots 26, optical module/component 102 may be pulled from retainer housing 14. Thus, removal of optical module/component 102 may be quickly accomplished with a single hand.

The angular optical component retention and removal system of the present invention provides many advantages over the conventional horizontal arrangement shown in FIG. 1. For example, space limitations due to bend radius requirements of cables provided in the front panel of conventional horizontal arrangements are eliminated with the present invention because the cables' bend radii are reduced with the present invention. Furthermore, by placing optical components at an angle with the angular optical component retention and removal system, less clearance space is required in front of the faceplate for provision of the fiber optic cables. By requiring less clearance space, the system of the present invention enables the main or mother PCB to be extended, enabling more densely packed optical components on the main or mother PCB, and much higher densities of connections over the conventional horizontal arrangement.

It will be apparent to those skilled in the art that various modifications and variations can be made in the angular optical component retention and removal system of the present invention and in construction of the angular optical component retention and removal system without departing from the scope or spirit of the invention. As an example, although the drawings show a certain number of optical components 102, 104 and cables 118, the present invention is not limited to this number. Rather, more or less optical components 102, 104 and cables 118 may be provided with the angular optical component retention and removal system depending upon the physical dimensions of optical components 102, 104, faceplate 120, and PCB 108. Furthermore, the present invention is not limited to use with fiber optic cables, and may be used with any cable having a minimum bend radius, such as, for example, telephone cable having a plurality of copper conductors, coaxial cable, or the like. In such an application, fiber optic cables 118 shown in the drawings, would be replaced with any cable having a minimum bend radius, such as telephone cable having a plurality of copper conductors, coaxial cable, or the like. Other examples of the modifications and variations that may be made to fiber optic cable management system of the present invention were set forth previously.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical component system comprising:
   a printed circuit board having a faceplate removably connected thereto,
   said faceplate being releasably attached to said printed circuit board,
   an angular optical component retainer housing extending through said faceplate and being connected to said faceplate, said retainer housing having a main body portion, a first section and a second section and said main body portion is connected to said faceplate,
   said first section of said housing includes an opening for receiving and retaining an optical component, said second section of said housing includes an opening for receiving and retaining said optical component,
   said first section includes an upper wall having an upper cam slot therein and a lower wall having a lower cam slot therein,
   an insertion and removal mechanism for inserting and removing said optical component from said housing, said mechanism includes a handle connected to an upper sidewall and a lower sidewall, said upper sidewall having a first cam and a first projection, said lower sidewall having a second cam and a second projection, whereby, when said mechanism is inserted in said housing said first cam is received into said upper cam slot and said second cam is received into said lower cam slot.

2. The optical component system as set forth in claim 1, wherein; said first projection is inserted into said upper cam slot and said second projection is received into said lower cam slot.

3. The optical component system as set forth in claim 1, wherein; said optical component includes a connector socket for receiving a fiber optic cable at an angle of less than 90 degrees to said faceplate.

4. The optical component system as set forth in claim 3, further comprising;
- a secondary housing that further retains said optical component,
- said secondary housing includes a top, a bottom and sides for forming a cavity sized to receive said optical component.

5. The optical component system as set forth in claim 4, wherein said secondary housing includes an electrical contact pad for electrically coupling said optical component to said printed circuit board.

6. The optical component system as set forth in claim 5, wherein said optical component includes a spring retainer for engaging a spring retainer slot in said retainer housing.

7. The optical component system as set forth in claim 6, wherein to effectuate removal of said optical component, said first cam contacts said spring retainer for disengaging said spring retainer from said spring retainer slot in said retainer housing.

8. An insertion and removal mechanism for an optical component comprising:
- a handle formed at a first end of an upper sidewall, said upper sidewall extending away from said handle and having a first cam located on the upper sidewall near said handle and a first projection located on said upper sidewall and spaced away from said first cam,
- a lower sidewall spaced from said upper sidewall so that an optical component can be located between said upper and lower sidewalls,
- said lower sidewall having a second cam and a second projection spaced away from said second cam,
- said upper sidewall and said lower sidewall are connected by at least one cross member, whereby an optical component held between said upper and lower sidewalls can be inserted and removed from a retainer housing.

9. The insertion and removal mechanism for an optical component as set forth in claim 8, wherein said retainer housing is mounted at an angle of less than 90 degrees from a faceplate.

10. The insertion and removal mechanism as set forth in claim 9, wherein said optical component includes a spring retainer for engaging a spring retainer slot in said retainer housing.

11. The insertion and removal mechanism as set forth in claim 10, wherein to effectuate removal of said optical component, said first cam contacts said spring retainer for disengaging said spring retainer slot in said retainer housing.

* * * * *